May 29, 1962    A. LOSSEV    3,036,507
AUTOMATIC FILM ADVANCER FOR ROLL FILM CAMERAS
Filed Oct. 8, 1957

INVENTOR
ALEXANDER LOSSEV

United States Patent Office 3,036,507
Patented May 29, 1962

3,036,507
AUTOMATIC FILM ADVANCER FOR ROLL FILM CAMERAS
Alexander Lossev, Bloomfield, N.J.
(47 N. Fullerton Ave., Montclair, N.J.)
Filed Oct. 8, 1957, Ser. No. 688,937
3 Claims. (Cl. 95—31)

Mechanism described herewith and illustrated in the accompanying drawing is a spring motor driven device for advancement of the film in cameras of a roll film type. It winds up the film after each exposure automatically replacing the exposed area of the film with unexposed one required for a new exposure. The present invention is designed to advance so called paper-backed films having no marginal or any other perforations.

Figure 1:
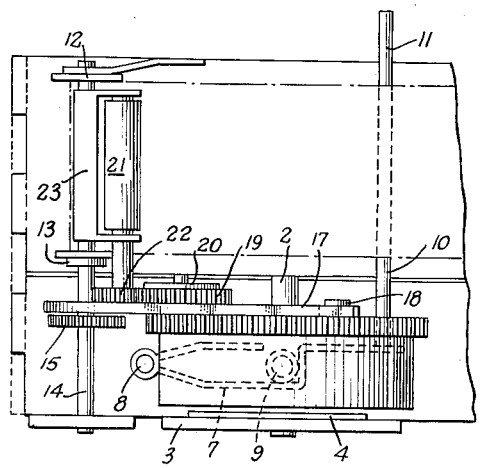
FIG. 1 is a rear view of the camera in upright position with the backwall removed.

A powerful spring 1, which may be wound up by means of a shaft 2 with an outside camera handle 3 and a ratchet 4, is inclosed in a drum or rotor 5 and may drive the latter in the direction of the arrow. Association of the ratchet 4 with the winding shaft 2 permits a motion of the shaft in proper direction and prevents any reverse revolution and recoiling of the spring 1. As such spring drives and the winding means therefor are well known a further discussion is not deemed essential. The rotor 5 is equipped with a gear 6 and provided with a roll 9 fixed to the side of the rotor 5 and circling with each revolution of the latter. A strong arm 7, preferably shaped as shown in the FIG. 1, is pivotally mounted on the camera casing at point 8, so that the circling roll 9 will pass between upper and lower portions of said arm 7. The arm 7 serves to intercept the circling roll 9 and in that way to arrest the motion of the rotor 5.

In lifted up position, shown in the FIG. 1, a portion B of the arm 7 blocks the way of the roll 9 and prevents the rotor 5 from rotation. The rod 10, which contacts the portion C of the arm 7, is connected to the exposure button 11 and depression of said button will simultaneously press the portion C of the arm 7 downwards and turn the arm 7 on the pivot 8. This will release the roll 9 through the opening between the portions A and B of the arm 7 and set the rotor 5 in motion. The arm 7 will remain in depressed position until roll 9 contacts portion A and returns said arm to its initial position. In that way the portion B of the arm 7 will move again into course of the circling roll 9 and bring the latter and the rotor 5 to a standstill.

The film is advanced by a rotary motion of the wind up spool 12 in the usual way. The wind up spool 12 is adapted to receive the motion from a vertical shaft 14 by means of a socket 13. The shaft 14 receives a rotary motion by revolution of a gear 15 mounted upon it. This gear does not mesh with the power gear 6, but a lever 17 pivotally mounted upon the said shaft 14 is carrying a planet pinion 16 which constantly meshes with the gear 15 and is alternately moved in and out of gear with the power gear 6 by the shifting motion of the lever 17. When the lever 17 is in the operative position, as shown in the FIG. 3, the power gear 6 and the planet pinion 16 are meshing and the latter transmits the power to the winding up means. The motion of the lever 17 into the inoperative position shown in the FIG. 2 will disengage the gears 6 and 16 and consequently stop advancement of the film. The lever 17 is operated by a roll 18, mounted upon and circling with the rotor 5, and a film measuring device described below. When the rotor 5 is set in motion the roll 18 following a circular course will press the outer end of the lever 17 aside turning the lever 17 on its pivot and moving the opposite end of it with the planet pinion 16 closer to the rotor 5. The gear 6 does not cover the entire perimeter of the rotor and the planet pinion will approach the rotor at the spot where a part of the gear 6 is missing, but immediately afterwards the gear 6 carried by the rotor 5 will reach the planet pinion 16, mesh with it and transmit the motion to the winding up means as long as the lever 17 will stay in the operative position.

A film measuring roller 21 provided with a gear 22 is mounted on the backwall of the camera casing by means of a bracket 23. The measuring roller 21 slightly presses the paper-back of the film between the winding up spool 12 and a supporting roller and advancing of the film will rotate it and gear 22 connected to it. The measuring roller 21 may be provided with means for increasing friction between the paper back of the film and the roller.

Figure 2:
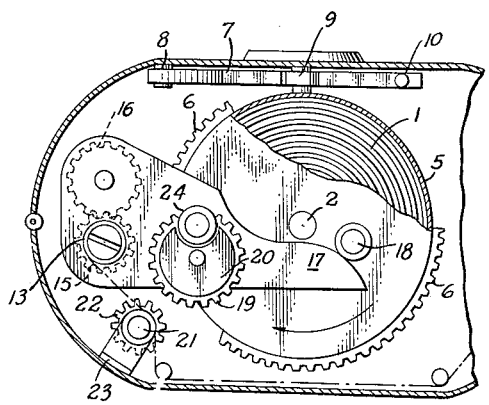
FIG. 2 is a view illustrating the mechanism in an inoperative position.
Figure 3:
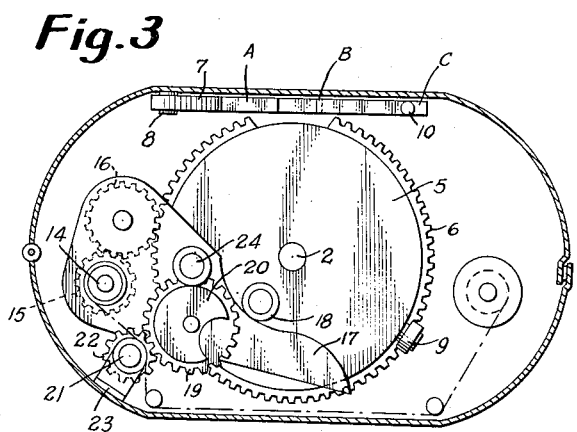
FIG. 3 is a similar view showing the same details in an operative position.

The lever 17 carries a gear 19 which has secured to it a disc 20. The shifting motion of the lever 17 brings the gear 19 in and out of engagement with the gear 22 upon the measuring roller. In the inoperative position of the lever 17 the gears 19 and 22 do not mesh, but shifting of the lever 17 into operative position will engage said gears. The disc 20 is provided with one or more openings in the perimeter as shown in FIGS. 2 and 3. When the lever 17 is in the inoperative position a roll 24 fixed to the camera casing rests in said opening. Motion of the lever 17 into the operative position will move the disc 20 aside leaving the roll 24 outside the opening. The gear 22 will drive gear 19 and rotate the disc 20; this will displace the opening of the disc and will hold the lever 17 in an operative position until motion of the disc 20 will bring the opening in a position which will permit the roll 24 to enter the opening again. A small spring, not shown in the drawing, will help the lever 17 to return into inoperative position.

Operation of a camera with an automatic film advancer described herewith is simple: for an easy and quick reloading of the film the backwall of the camera with the measuring roller may be opened on hinges. After one end of the film is fastened to the winding up spool and the camera closed the film should be wound up to the first picture manually by means of an outside camera handle. After the spring motor is tensioned a snapshot can be taken in the usual way. Each time after depression of the exposure button the rotor will make one complete turn and advance the film in the above described manner. The ordinal numerals upon the paperback to of the film will appear in the red rear window of the camera in the usual way. During advancement of the film or when the spring drive is not tensioned sufficiently the exposure button remains depressed and a snapshot can not be taken until advancement of the film is completed or the spring wound up.

It is to be understood that the idea of this invention may be carried out in a number of ways. This application is therefore not limited to the precise details described but is intended to cover all variations and modifications thereof falling within the spirit of present invention and the scope of appended claims.

I claim:

1. In a roll film camera using non-perforated films, a spring motor, a member for transmitting motion from said spring motor to the film advancing means, a lever for operating said member, a member upon the spring motor for actuating said lever, a film measuring roller adapted to receive motion from advancement of the film and transmit it to a member rotatably supported upon said lever, a disc having an opening in the perimeter secured upon and rotating with said member upon the lever, a member upon the camera casing movable into said opening to permit return movement of said lever, an arm pivotally supported upon the camera casing cooperating with a member upon the spring motor for stopping and releasing of the latter, and means for operating said arm adapted to remain in depressed position during advancement of the film.

2. In a roll film camera using non-perforated films, a rotary shaft having a gear and a socket adapted to actuate the film winding-up spool, a lever pivotally mounted upon said shaft, a motor, a gear upon the motor, a roll upon the motor for actuating said lever, a pinion meshing with the winding up gear and carried by said lever into and out of engagement with the gear upon the motor, a film measuring roller with a gear mounted upon the backwall of the camera casing, a disc having an opening in the perimeter secured upon and rotating with a gear carried by said lever into and out of meshing with the gear on the measuring roller, a roll upon the camera casing movable into said opening to permit return movement of said lever, an interceptive arm pivotally supported upon the camera casing in combination with a roll upon the motor for stopping and releasing of the latter means for operating said arm adapted to remain in depressed position after the exposure and to return into initial position after the advancement of the film is completed.

3. In a roll film camera using non-perforated films, a spring actuated rotor, a transmissive member adapted to be periodically moved into driving relation with said rotor and operatively interposed between the latter and the film advancing means, a pivotally supported lever for moving said transmissive member, means upon said rotor for actuating said lever, a timing device rotatably mounted upon said lever for controlling performance thereof, film measuring means adapted to be actuated by motion of the film and impart action to said timing device, interceptive means pivotally attached to the camera casing for stopping and releasing of said rotor, means for simultaneous operation of the exposure button and said interceptive means adapted to remain a depressed position during advancement of the film.

References Cited in the file of this patent

UNITED STATES PATENTS

| | | |
|---|---|---|
| 1,253,079 | Mordaunt | Jan. 8, 1918 |
| 1,501,677 | McMahon | July 15, 1924 |
| 2,227,240 | Becker et al. | Dec. 31, 1940 |
| 2,271,221 | Dortning et al. | Jan. 27, 1942 |